United States Patent
Schemmann

(10) Patent No.: US 10,101,226 B2
(45) Date of Patent: Oct. 16, 2018

(54) PRESSURE SENSOR UTILIZING BRAGG GRATING WITH SINGLE MODE FIBER

(71) Applicants: FOCE TECHNOLOGY INTERNATIONAL BV, Maria Hoop (NL); FSP LLC, Vancouver, WA (US)

(72) Inventor: Marcel F Schemmann, Maria Hoop (NL)

(73) Assignee: FOCE TECHNOLOGY INTERNATIONAL BV, BN Maria Hoop (NL)

( * ) Notice: Subject to any disclaimer, the term of this patent is extended or adjusted under 35 U.S.C. 154(b) by 192 days.

(21) Appl. No.: 14/913,970

(22) PCT Filed: Aug. 25, 2014

(86) PCT No.: PCT/US2014/052578
§ 371 (c)(1),
(2) Date: Feb. 23, 2016

(87) PCT Pub. No.: WO2015/027247
PCT Pub. Date: Feb. 26, 2015

(65) Prior Publication Data
US 2016/0356659 A1    Dec. 8, 2016

Related U.S. Application Data

(60) Provisional application No. 61/869,639, filed on Aug. 23, 2013.

(51) Int. Cl.
G01L 1/24 (2006.01)
G01D 3/028 (2006.01)
G01D 5/353 (2006.01)

(52) U.S. Cl.
CPC .............. G01L 1/246 (2013.01); G01D 3/028 (2013.01); G01D 5/35316 (2013.01)

(58) Field of Classification Search
CPC ..... G01L 1/246; G01D 5/35316; G01D 3/028
See application file for complete search history.

(56) References Cited

U.S. PATENT DOCUMENTS

| 6,816,266 B2 | 11/2004 | Varshneya et al. |
| 2008/0180681 A1 | 7/2008 | Digonnet et al. |
| 2009/0137092 A1 | 5/2009 | Narita et al. |

OTHER PUBLICATIONS

International Preliminary Report on Patentability for PCT application No. PCT/US/2014/052578, dated Feb. 23, 2016.

*Primary Examiner* — Tony Ko
(74) *Attorney, Agent, or Firm* — FSP LLC

(57) ABSTRACT

A pressure sensor includes a single-mode optical fiber and a fiber Bragg grating coupled to the single model fiber. The sensor detects a wavelength shift of a reflection spectrum of the Bragg grating for input light signals to the single mode fiber at different polarization states. A pressure measurement is obtained by determining at least a pair of mutually orthogonal polarization states for the input light at which the wavelength shift of a reflection spectrum of the Bragg grating is a maximum.

8 Claims, 8 Drawing Sheets

PRESSURE SENSOR UTILIZING BRAGG GRATING WITH SINGLE MODE FIBER

CROSS-REFERENCE TO RELATED APPLICATIONS

This application claims priority and benefit as a national stage application under 35 U.S.C. 371 of PCT application no. PCT/US14/52578, filed on Aug. 25, 2014, which claims priority to US application No. 61/869,639, filed on Aug. 23, 2013, each of which is incorporated herein by reference in their entirety.

BACKGROUND

Fiber Bragg gratings are used for pressure sensing where the strain in the material is translated to a wavelength shift of a Bragg reflection. Polarization maintaining fibers are also used in pressure sensors including uni-axial pressure sensors where the wavelength shift of a Bragg reflection at one polarization differs from the wavelength shift in a second, orthogonal polarization. A single fiber can incorporate multiple sensors realized with Bragg gratings that reflect at different wavelengths and optionally multiple Bragg gratings reflecting at the same wavelength are incorporated in the fiber and differentiated by the "time of flight" of the reflections induced by these gratings when illuminated by an optical light pulse at the input to the fiber.

Uni-axial pressure sensors rely on the bi-refringence of glass optical fibers under uni-axial pressure. This means that the wavelength shift of Bragg reflectors incorporated in such fibers due to pressure applied differs for polarizations aligned with the pressure axis or orthogonal to the pressure axis. Regular single mode fiber is not polarization preserving, this means that light launched into the fiber in a particular polarization state does not remain in that state as it easily couples to modes in other polarization states that have nearly the same propagation constant. Index fluctuations and mechanical deformation of the fibers provide an effective coupling mechanism such that the input polarization state is typically lost within a small distance such as a few meters or less. Polarization maintaining fibers have a built-in stress in the fiber such that there are two orthogonal polarization states (typically linear) that have a significant difference in propagation constant such that light does not couple easily between modes in these two polarization states. Therefore light launched in one of the states remains in that state and fiber Bragg gratings can then be interrogated in a particular polarization state. Aligning the axis of the fiber with a pressure axis to be sensed allows the measurement of uni-axial pressure. However even when no pressure is applied the two propagation constants of the fiber differ and therefore two different Bragg reflections wavelengths (one of each orthogonal polarization) will occur where the exact wavelength difference depends on the amount of bi-refringence built into the fiber. It would be preferable to have a sensor that does not have a built in shift of the Bragg reflections and only shows a shift when uni-axial pressure is applied.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
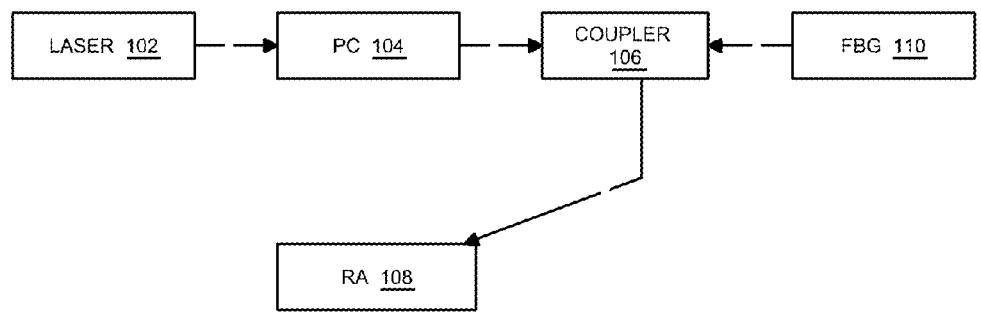
FIG. 1 an embodiment of a system employing a FBG sensor
Figure 2:
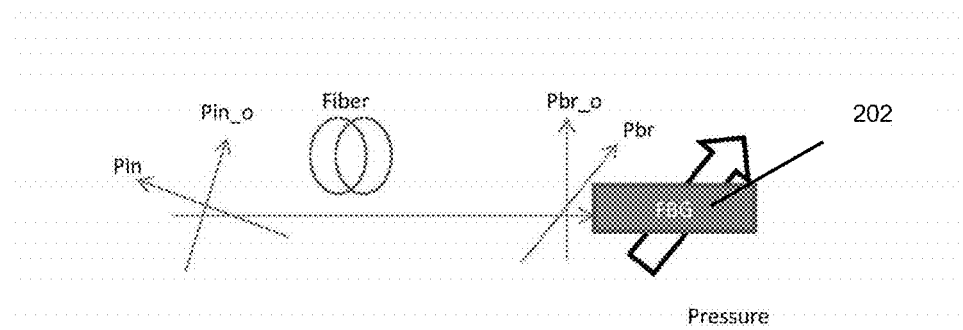
FIG. 2 illustration of an embodiment of optical fiber coupled to FBG under pressure FIG. 3 sensor system embodiment comprising two tunable lasers each modulated at a different frequency FIG. 4 sensor system embodiment comprising tunable lasers followed by a dual output Mach Zehnder (MZ) modulator
Figure 3:
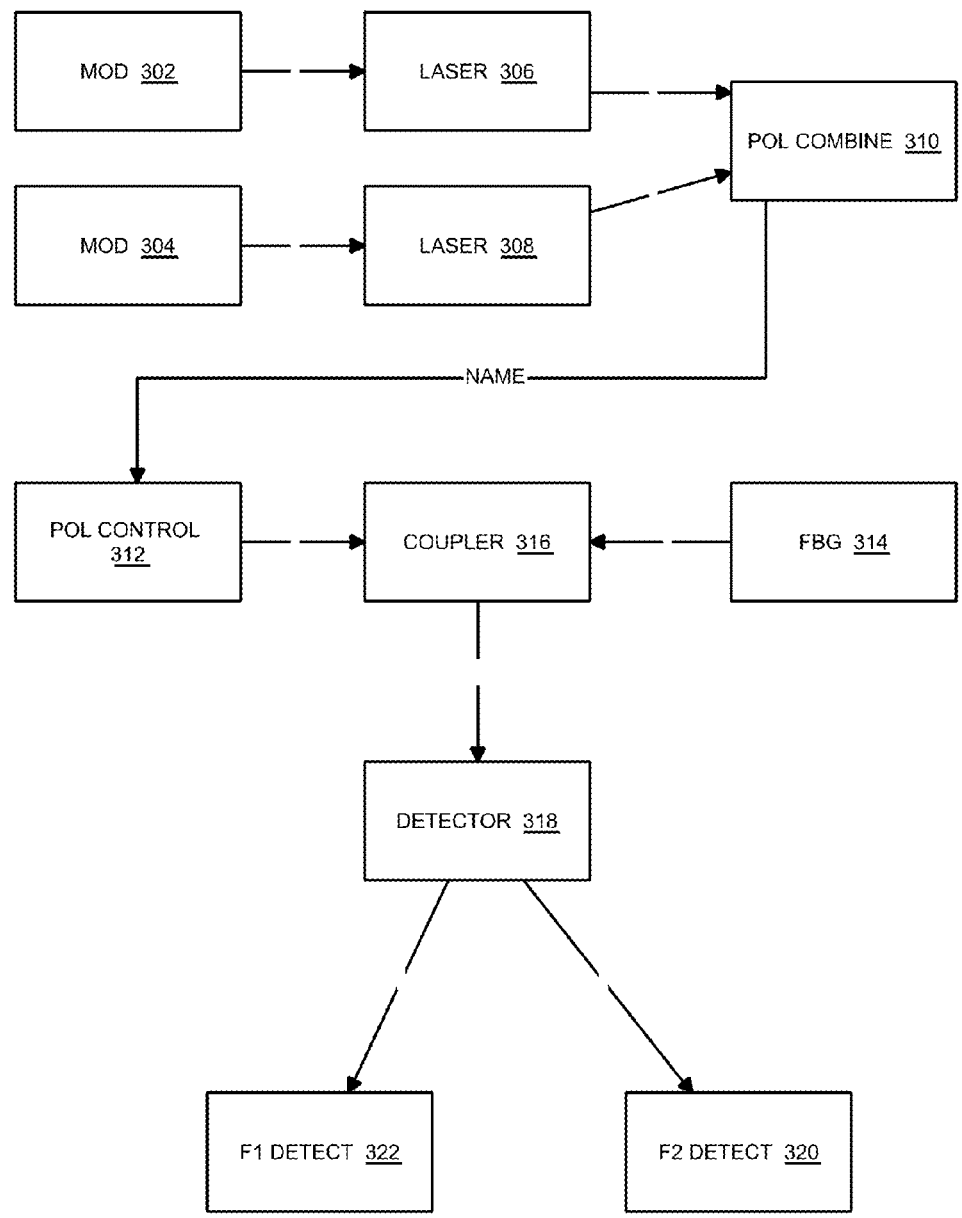

Described herein is a system and method to incorporate multiple uni-axial pressure sensors in a single optical fiber. Single mode fiber is preferred rather than polarization maintaining fiber, resulting in a sensor system that can be read out over large distances at lower cost.

When using a single mode fiber, the polarization state at a Bragg grating is not known given an input polarization state for light launched toward the Bragg grating. However, by using a polarization controller all possible polarization states can be created given an input polarization state Pin. In case a linear polarization state Pbr is found at the Bragg grating that is in line with a pressure axis, an orthogonal input polarization state Pin_o will create a polarization state Pbr_o at the Bragg grating that is orthogonal to Pbr and thus orthogonal to the pressure axis. A uni-axial pressure applied to the fiber will shift the Bragg reflection wavelength of polarization state Pbr (at the Bragg grating) relative to the Bragg reflection wavelength of polarization state Pbr_o. A Bragg reflector short enough to preserve a particular polarization state Pbr or Pbr_o throughout the length of the Bragg reflector even in single mode fiber is utilized. A readout system is utilized that launches light in a polarization state Pin and an orthogonal polarization state Pin_o, for instance by switching between these two modes. Whereas Pin itself is not defined, the orthogonality between Pin and Pin_o is retained even when the input light is passed through a polarization controller and a fiber. The polarization controller is scanned through all possible polarization states such that at the Bragg grating a polarization state Pbr in line with a uni-axial pressure to be sensed is included in the scan. When the scan hits this polarization state Pbr then the wavelength of reflections of light at polarization states Pin and Pin_o exhibit a maximum mutual shift. As the polarization states are scanned, Pin may align with Pbr_o and thus implicitly Pin_o is aligned with Pbr_in; the mutual shift of the reflection wavelength is as great, but reversed in this case.

The system may utilize uni-axial pressure sensing based on determining the wavelength dependence of a fiber Bragg grating, where the reflection spectrum exhibits a wavelength shift dependent on the amount of pressure applied. This shift is greatest when an input polarization state is aligned with the axis of the pressure, and where preferably the pressure sensor is implemented with standard single mode fiber which does not require rotational alignment with the pressure axis. The pressure measurement may be performed by determining the shift of the Bragg grating reflection spectrum at a first and a second polarization state that are mutually orthogonal, and identifying the first polarization state where the mutual shift between reflection spectra of first and second polarization states are maximal (or close to maximal). The first polarization state may be modified with a polarization controller.

A polarization scan may change Pin such that all possible states Pbr are obtained in practice. However, for a given Pin, Pbr is not stable. In some cases vibrations and temperature cause polarization states to drift. Change rates due to these influences may occur in the ultrasonic range, generally faster than the input polarization scan. Even when a (expensive) fast polarization scanner is utilized the delay in the reflection of a Bragg grating at some distance in the fiber (for instance several km) inhibits an ability to keep Pbr stable by controlling Pin, because the feedback loop is too slow. This may be designed for in a number of ways, for instance the reflection spectrum of the Bragg grating may be monitored continually such that when Pbr and Pbr_o are "hit" there is a momentary snap shot of their reflection spectra that is stored. Post-processing may be applied to determine the maximum shift between all reflection spectra collected, resulting in a measurement of uni-axial pressure applied. Another technique is to monitor both orthogonal reflection spectra at the same time, which may be be accomplished by using two light sources combined with a polarization combiner preceding the polarization controller in the signal path. Each light source may be modulated at its own frequency, and these frequencies may be detected separately. Another approach is to alternatively sending out two orthogonal polarization states at a high frequency.

If Pin and Pin_o are launched alternating in rapid succession, the alternation rate may for instance be in the MHz to GHz range such that during the reflection spectrum measurement the polarization state is essentially stable. The spectrum analysis of the reflection is then performed, including a demodulation, such that momentarily a signal is obtained on the mutual shift of the reflection spectra.

In one embodiment the total amount of light launched into the fiber is held constant, optionally by monitoring the amount of light and controlling the loss of one of the polarization axes Pin or Pin_o. The wavelength of a laser source used to interrogate the Bragg gratings is scanned to determine the wavelength dependence of their reflection spectra. When no uni-axial pressure is applied, the reflected light of Pin and Pin_o is approximately the same, and no modulation in the reflected light due to the alternating modulation of Pin and Pin_o may be detected. With uni-axial pressure there is a modulation that is largest when the polarization state aligns with Pbr or Pbr_o. The sign of the modulation swaps whether Pbr or Pbr_o is hit, therefore tracking the phase of the detected modulation may be of value. If the system has some polarization dependent loss, the fact that light launched into the fiber had a constant power irrespective of whether Pin or Pin_o was launched does not guarantee that a reflection of these two polarization states would be equal, and there would be a modulation detected in the reflection even with equal reflectivity for Pbr and Pbr_o (with no pressure applied). However, this modulation would be present at any wavelength, even when the reflectivity of the Bragg gratings is constant, which always occurs at some wavelength. Thus an amount of polarization dependent loss can be detected by this property and corrected for.

Figure 4:
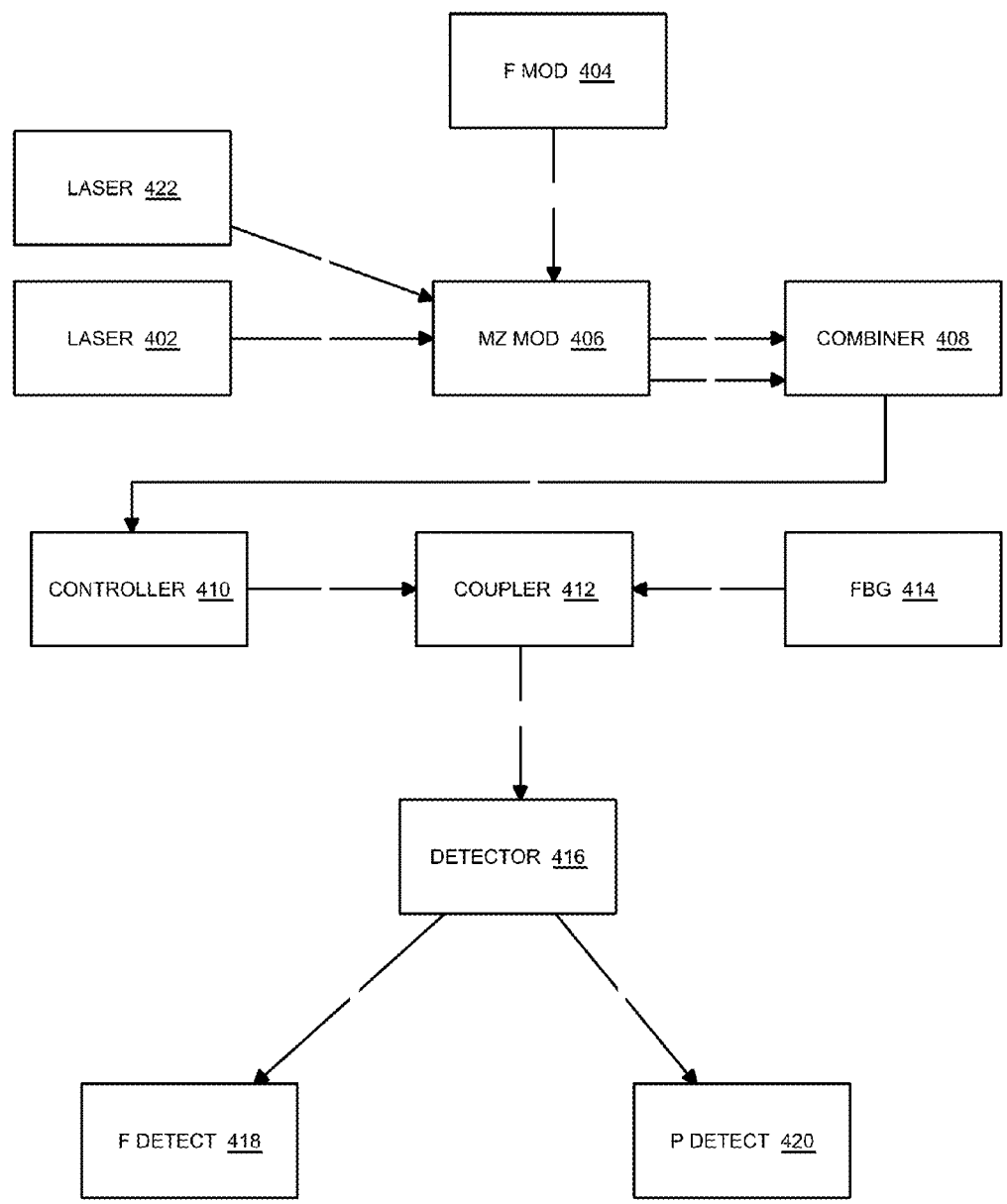

In some embodiments, a variable gain amplifier (e.g., a VCA, also referred to as a voltage controlled amplifier) may receive an output of a modulator (e.g., an MZ modulator 406 as illustrated in the embodiment of FIG. 4). An output of the variable gain amplifier may be provided to a combiner (e.g, the combiner 408 of FIG. 4) along with an output of the MZ modulator 406. A processor/controller may be employed to control the output of the variable gain amplifier as described for example in the preceding paragraph to control loss of polarization state. A forward modulation detector may be provided with an output of the coupler (e.g., FIG. 4 element 412). In this manner, a system with forward detection of modulation and control of loss of at least one polarization state to eliminate modulation of forward power may be enabled.

Radio frequency (RF) modulation may also be used for Pin and Pin_o to facilitate independent detection of Pin and Pin_o on a single detector, by modulating Pin and Pin_o at different frequencies. Each frequency may be demodulated separately and thus result in the reflections for Pin and Pin_o independently.

Modulation of the source laser may be used to sweep the wavelength, or a phase modulator may be applied for additional modulation and generation of cross-modulation products to facilitate detection. With a white light source or broadband source, reflections may be generated at multiple wavelengths simultaneously. Mixing of these reflections may result in a direct RF signal frequency to detect. In any of these applications, a polarization controller may be applied to scan through polarization states into a fiber, and the Bragg grating reflectivity at mutually orthogonal polarization states is determined. The wavelength dependence of the reflectivity is determined, and it is determined what the maximum mutual shift of those reflection spectra is while the polarization state is scanned.

Figure 5:
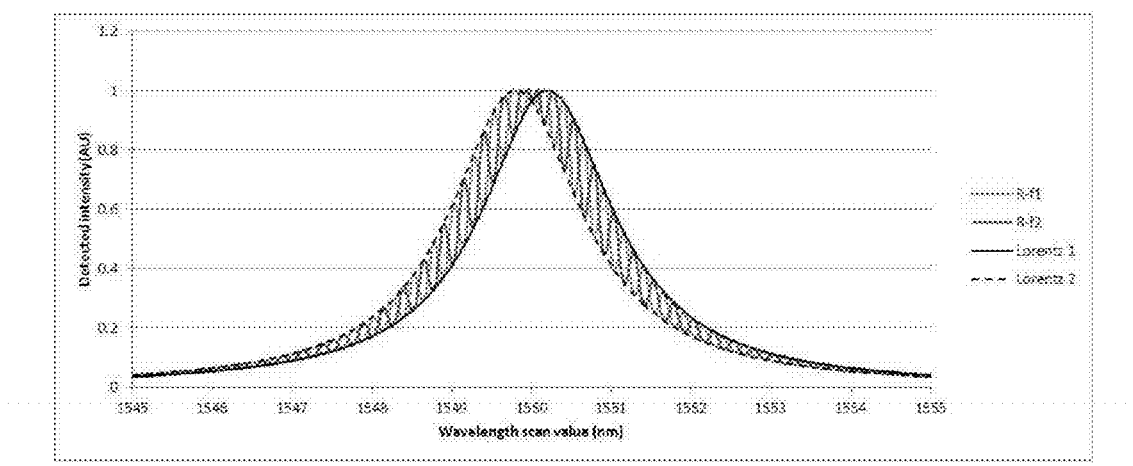
FIG. 5 illustrates an example of detected reflection during a wavelength scan FIG. 6 the same measurements as illustrated in FIG. 5, but when the polarization modulation is not fast enough to ensure hitting the extremes of the two curves rapidly enough to construct the fits
Figure 6:
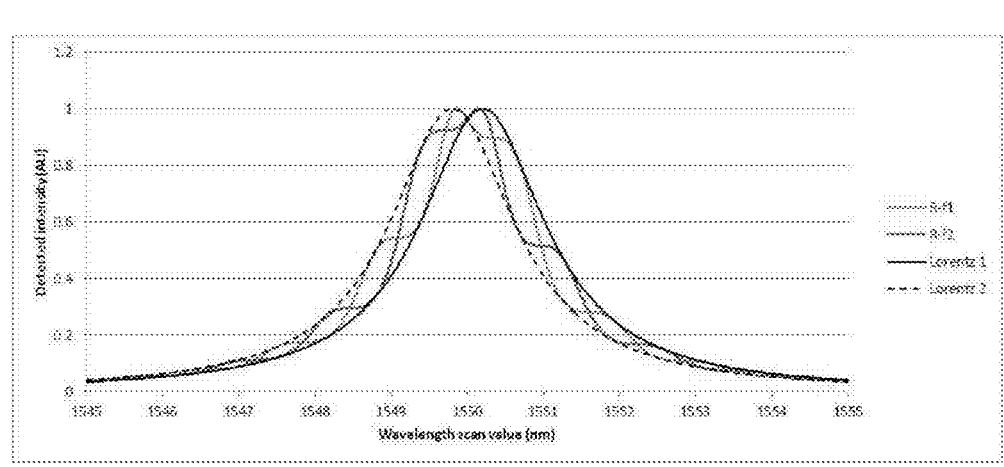
Figure 7:
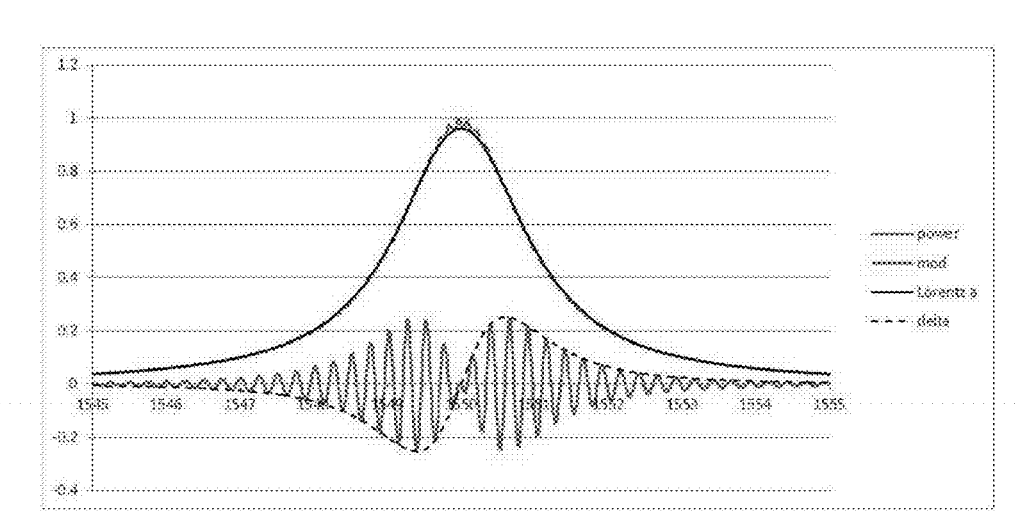
FIG. 7 illustrates an example of the average power and magnitude of a signal modulated at frequency "mod" using an MZ modulator, in which a Lorentz curve and difference Lorentz curve ("delta") are fit FIG. 8 curve fit results in an example system launching one varying polarization state and scanning the wavelength slowly enough to reconstruct the two reflection curves
Figure 8:
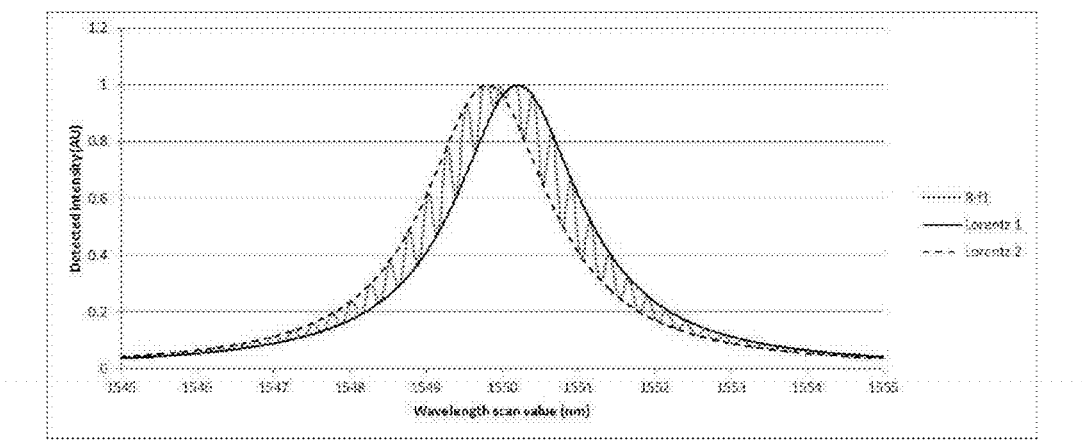

While the polarization state is scanned, the mutual shift of the reflection spectra is not maximized. However the scan is rapid enough that during a wavelength scan the mutual shift is maximized sufficiently to reconstruct the minimum and maximum reflection spectra. One example of this is illustrated in FIG. 5.

Drawings

An embodiment of a sensor system includes a wavelength tunable laser 102, a polarization controller 104, a coupler (or circulator) 106, fiber (arrows) and a fiber Bragg grating (FBG) sensor 110 reflecting light with a polarization and wavelength dependent reflection that is at least in part provided to a reflection analysis system. A reflection analysis system 108 may comprise a photodiode and data processing or also include spectral filtering or optical spectrum analysis. The laser 102 may also be a broadband light emitting diode where the reflection analysis would include some spectral analysis for instance with a spectrum analyzer. The laser 102 may be a tunable laser where the reflection analysis is done such that the wavelength of the tunable laser is a parameter in the reflection analysis. In either case the reflection is determined as a function of wavelength such that the reflection spectrum of the Bragg grating 110 may be determined for various polarization states.

The pressure is in-line with a polarization state Pbr at the fiber Bragg grating 102 and orthogonal to Pbr_o. Fiber input polarization states Pin and Pin_o generate light in polarization states Pbr and Pbr_o at the fiber Bragg grating 102.

Two tunable lasers 306, 308 are each modulated by modulators 302, 304 respectively, at frequencies F1 and F2 respectively. The output of the lasers 306, 308 are provided to a polarization combiner 310. The combiner 310 outputs light in mutually orthogonal polarization states to a polarization controller 312 that scans for polarization states. The output of the polarization controller 312 is provided to a coupler 316 which sends the light output to (and receives light output from) FBG 314.

A detector 318 receives the light output of the combiner 316. The output of detector 318 is provided to specific frequency detectors 322 and 320 which detect frequencies F1 and F2, respectively. This system monitors the reflection spectrum of the lasers 306, 308 simultaneously; the outputs of lasers 306, 308 are launched at an orthogonal polarization state and thus arrive at the FBG 314 in mutually orthogonal polarization states.

The lasers 402, 422 input light followed by a dual output Mach Zehnder (MZ) modulator 406, for instance fabricated with Lithium Niobate (LiNbO3) modulated at a frequency f_mod by the frequency modulator 404, followed by a polarization combiner 408 alternately outputting light from two mutually orthogonal polarization states at a rate f_mod, followed by a polarization controller 410 to scan polarization states. The coupler 412 combines signals from the controller 410 and FBG 414. A detector 416 is coupled to the output of the coupler 412, and to detectors for frequency 418 (f_mod) and average power 420 respectively. This system monitors the reflection difference of two orthogonal polarization states that arrived at the FBG 414 in mutually orthogonal polarization states. The average reflection is also measured at the power detector 420 such that the individual reflection curves may be reconstructed from the two orthogonal polarization states at the FBG 414.

While the wavelength is scanned, the polarization state is scanned more rapidly. This is illustrated by the fast modulation in the plot of signals detected at frequencies Freq 1 and Freq 2 (e.g., two modulation frequencies). At each modulation frequency, a similar result is found, but in counter-phase. Two curves are fit (e.g., using logic applied to a machine processor circuit) to the extremes of the modulation (in this example Lorentz curves). The mutual shift of those two curves is the wavelength shift of the fiber Bragg grating induced by uni-axial pressure.

Knowledge that the curves of each polarization state are in counter-phase facilitates fit to the example Lorentz curves.

What is claimed is:

1. A pressure sensor comprising:
a single-mode optical fiber;
a fiber Bragg grating coupled to the single mode optical fiber;
a detector coupled to the fiber Bragg grating to detect a wavelength shift of a reflection spectrum of the Bragg grating for input light signals to the single mode fiber at different polarization states; and
logic to obtain a measurement of pressure on the Bragg grating by determining at least a pair of mutually orthogonal polarization states for the input light at which the wavelength shift of a reflection spectrum of the Bragg grating is a maximum.

2. The system of claim 1, further comprising:
logic to monitor and store the reflection spectrum of the Bragg grating as machine data, and to process the stored spectrum data to identify the pair of mutually orthogonal polarization states for the input light at which the wavelength shift of a reflection spectrum of the Bragg grating is a maximum.

3. The system of claim 1, further comprising:
at least two light sources providing input light signals to the single mode optical fiber, each modulated at a different frequency; and
detectors for a reflection spectrum of the Bragg grating at each modulation frequency.

4. The system of claim 1, further comprising:
a polarization state modulator to input light signals to the single mode fiber at at least two orthogonal polarization states at a modulation rate of at least 1 GHz.

5. The system of claim 4, further comprising:
the modulator is a Mach Zehnder modulator followed by a polarization combiner.

6. The system of claim 4, further comprising:
a power detector to measure an average power of the reflection spectrum of the Bragg grating.

7. The system of claim 1, further comprising:
a polarization controller to scan polarization states of light input to the single mode fiber.

8. The system of claim 1, further comprising:
a controllable optical attenuator to control a loss of one of the polarization states of the input light signals.

* * * * *